United States Patent

Schmiedel

[15] 3,641,965
[45] Feb. 15, 1972

[54] TRIM INDICATOR SYSTEM
[72] Inventor: Robert C. Schmiedel, Oshkosh, Wis.
[73] Assignee: Brunswick Corporation, Chicago, Ill.
[22] Filed: Oct. 5, 1970
[21] Appl. No.: 78,046

[52] U.S. Cl. .................................. 115/41, 114/66.5 P
[51] Int. Cl. ............................................ B63h 5/12
[58] Field of Search ............ 115/41, 35; 114/66.5, 66.5 P; 116/124

[56] References Cited

UNITED STATES PATENTS

| | | | |
|---|---|---|---|
| 2,752,875 | 7/1956 | Hills | 115/41 R |
| 2,971,726 | 2/1961 | Bratt et al. | 244/76 R |

Primary Examiner—Milton Buchler
Assistant Examiner—Carl A. Rutledge
Attorney—Roy T. Montgomery

[57] ABSTRACT

A system for indicating to the boat driver the trim angle at which his stern drive is set. The system incorporates a variable resistor which is enclosed in waterproof housing. The housing is mounted on the gimbal ring or yoke at the end of the shaft which is the horizontal tilt axis. The movable portion of the variable resistor is attached to the shaft which forms the horizontal tilt axis of a stern drive. In this manner, a signal proportional to the angle of tilt of the stern drive is created and can then be transferred to an indicator gauge. A trim limit switch having interchangeable parts with the variable resistor can also be mounted on the other end of the horizontal tilt axis and connected to the power trim system to limit the angular trim position of the stern drive.

21 Claims, 10 Drawing Figures

PATENTED FEB 15 1972

INVENTOR.
ROBERT C. SCHMIEDEL
BY Roy L. Montgomery
ATTORNEY

INVENTOR.
ROBERT C. SCHMIEDEL
BY Roy T. Montgomery
ATTORNEY

TRIM INDICATOR SYSTEM

BACKGROUND OF THE INVENTION

This invention pertains to the field of instrumentation for marine devices. More particularly, it relates to instrumentation systems for indicating the angular position of an outboard drive unit.

Instrumentation for this purpose has long been known in the marine field. One of the more well-known systems for use with a stern drive utilizes a separate hydraulic piston and cylinder in the hydraulic power trim circuitry of the stern drive. Shielded push-pull cables were connected to the hydraulic cylinder to establish a mechanical connection between the cylinder and an indicator gauge located in the instrument panel of the boat. The problems with such systems were twofold. First, the mechanical linkages involved were expensive and susceptible to breakage. Second, errors were introduced due to both the backlash in the mechanical system and the indirect reading from the hydraulic cylinder rather than directly from the drive unit.

BRIEF SUMMARY OF THE INVENTION

In this invention an electrical system is utilized to indicate the trim position of the outboard drive unit. Such a system could also be used on the steering axis to indicate the steering position of the unit. This system includes a source of power or battery and an electrical indicator gauge. A variable resistor assembly is interposed between two members of the marine drive which pivot with respect to each other when the outboard drive unit is tilted on its horizontal axis. The drive unit could be an outboard motor or stern drive. Said two members could be on an axis coincident with the tilt axis or they could be on one of the shock absorber axes. In its preferred embodiment, the resistor assembly is interposed between the gimbal ring and the outboard drive unit of a stern drive at the horizontal tilt axis. The assembly is sealed in a housing which in turn is filled with a potting compound to aid in isolating the resistor assembly parts from the surrounding atmosphere. This is essential since the tilt axis is often under water. In this manner a repeatable direct signal is created in accordance with the angular position of the drive unit.

A limit switch assembly having parts interchangeable with the variable resistor assembly is mounted on the opposite end of the horizontal tilt axis and also is interposed between the gimbal ring and the outboard drive unit. The limit switch is electrically interconnected between a source of power and a hydraulic system to disconnect the hydraulic system when the outboard drive unit has reached its extreme outward driving position.

DETAILED DESCRIPTION OF THE INVENTION

Figure 1:
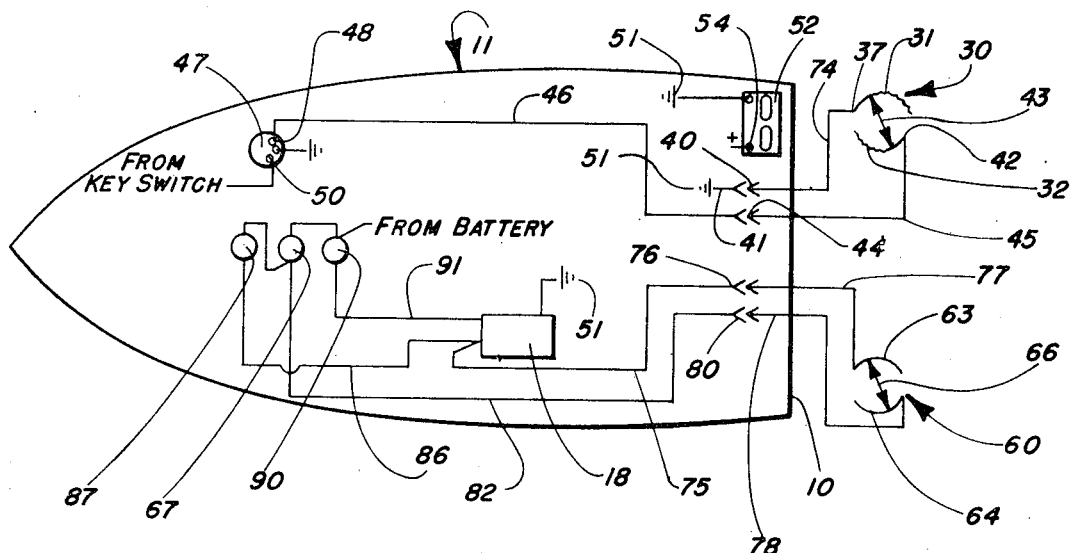
FIG. 1 is a schematic top plan view of a boat showing the electrical system.
Figure 2:
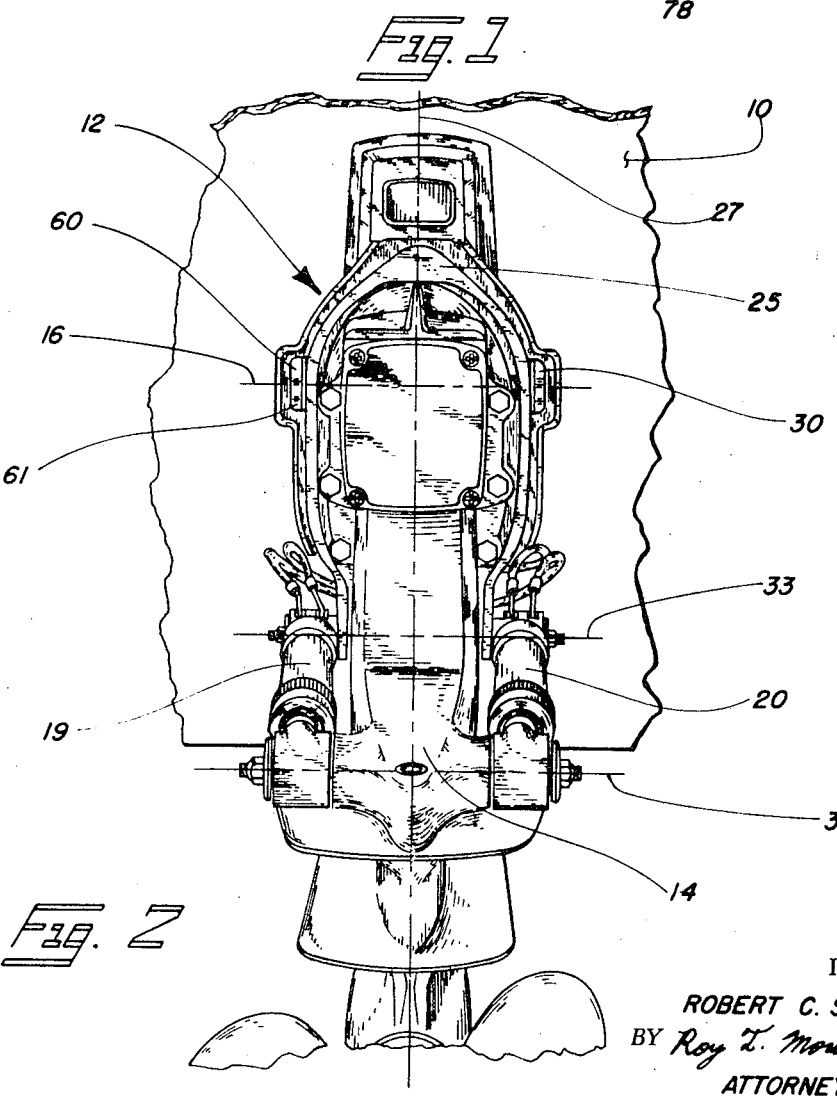
FIG. 2 is a partial rear elevational view partially in section of a stern drive with the assembly of this invention installed.
Figure 3:
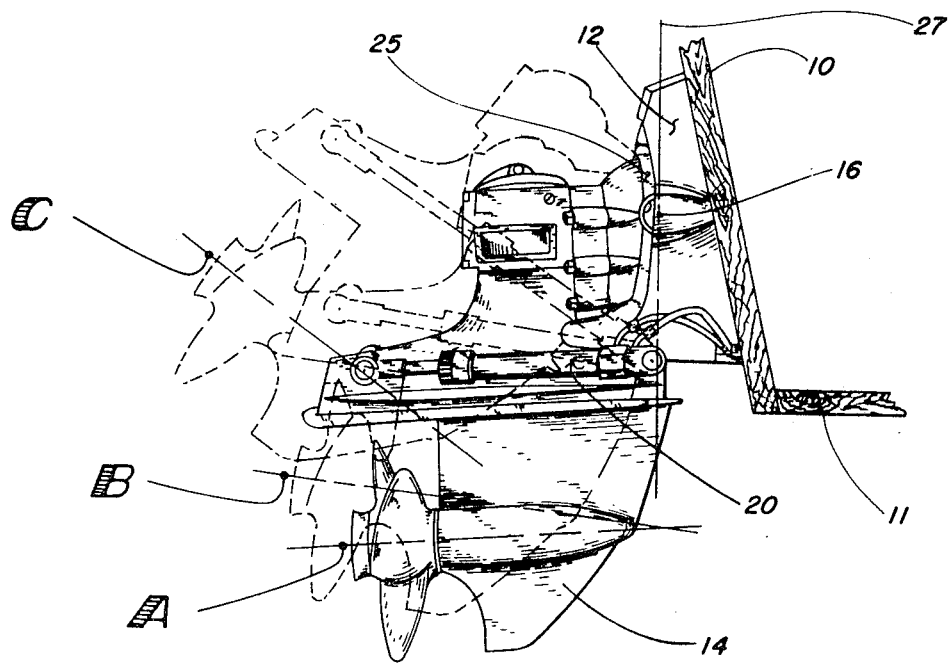
FIG. 3 is a side elevational view of a stern drive in three positions.
Figure 4:
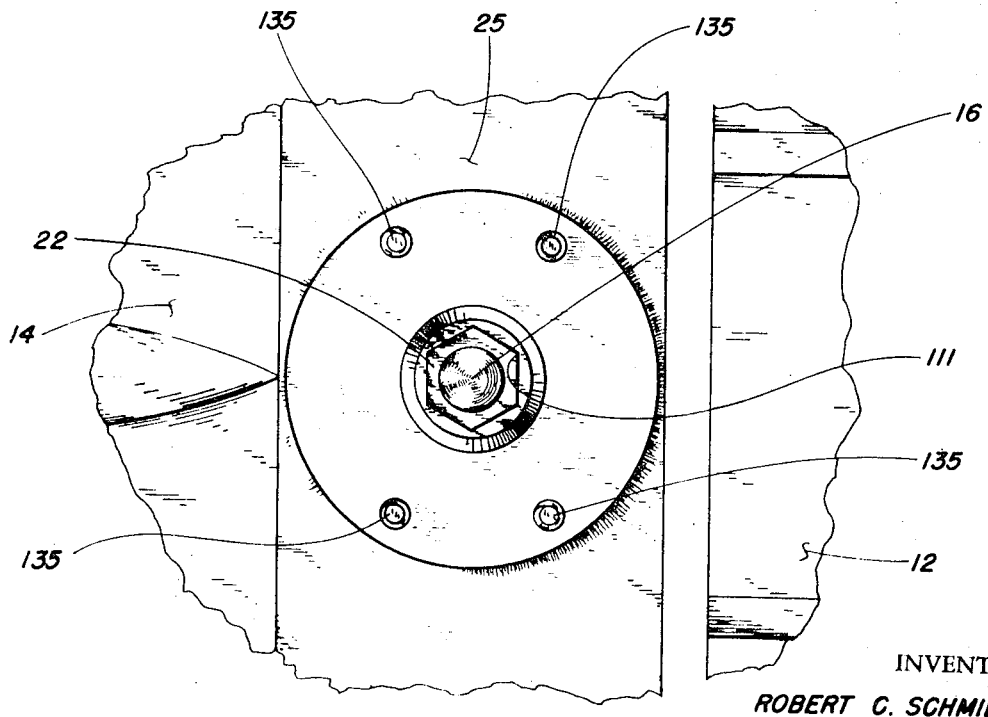
FIG. 4 is a side elevational view of a portion of a stern drive upon which a variable resistor assembly can be mounted.

Referring generally to FIGS. 2–4, there is shown a marine drive mounted on the transom 10 of a boat 11. The marine drive includes a transom mounting assembly 12 and an outboard drive unit 14 which is shown as a stern drive, but could also be an outboard motor. The drive unit 14 is carried on the mounting assembly 12 on a horizontal mounting axis 16 to tilt to any position within the extremes indicated by A and C in FIG. 3. A hydraulic system (described specifically in U.S. Pat. No. 3,434,448) utilizing a pump 18 (FIG. 1) and a pair of shock absorbers 19, 20 (FIGS. 2 and 3) serves as a means for positioning the drive unit at any desired tilt position. The drive unit 14 includes two outwardly extending horizontal shafts or members 22 and 23 (not shown) which are rotatably mounted in a gimbal ring or member 25. The gimbal ring 25 is mounted on the transom mounting assembly 12 for pivoting about a generally vertical axis 27 to steer the boat 11 in any desired direction.

In operation it is desirable to "tuck" the drive unit 14 under the boat toward position A when starting the boat 11 to aid it in planing. However, when the boat 11 is on plane, it is desirable to reposition the drive unit 14 further outward for maximum efficiency and speed. Once the operator establishes the optimum angle for given conditions, this invention provides a means for repeating those conditions. However, there is a maximum outward angle indicated by position B, above which it has been found unsafe to operate the drive unit 14 under power. Thus, it is desirable to limit the angle of the drive unit 14 to position B when operating under full power. A device for so limiting is provided in this invention. This invention further provides means for overriding the limit to move the unit 14 to the extreme upward position C for trailering or low-power operation.

Referring again to FIG. 1 and FIG. 2 there is shown a variable resistor assembly 30 mounted on the right side of the gimbal ring 25. The assembly 30 is mounted on a pivot axis on which two members rotate with respect to each other when the unit 14 is tilted. Such an axis is shown as coincident with the mounting axis 16 and the relatively rotating members are the shaft 22 and the gimbal ring 25. However, the pivot axis could readily be at either end of the shock absorbers 19 and 20 as indicated by 33 and 34. The assembly 30 includes two variable resistor elements or cards 31 and 32 which are fixed in a housing 38 which in turn is fixed to the gimbal ring or member 25 by the mounting screws 39. The assembly 30 further includes a contact rotor 43 with a contact rotor arm 68 fixed thereto having contacts 35 and 36 at each end thereof in contact with the resistor cards 31 and 32 respectively. The rotor arm 68 is preferably made of spring steel to assure continued contact. The rotor 43 is fixed to the end of the shaft 23 to rotate therewith in a manner which will be explained later. One end 37 of the card 31 is connected to the ground terminal 51 of the battery 52 through line 75, connector 40 and line 41. The diametrically opposite end 42 of the card 32 is connected to one terminal 48 of the trim indicator gauge 47 through line 45, connector 44 and line 46. The other terminal 50 of the trim indicator 47 is connected to the positive side 54 of the battery through the key switch (not shown).

Figure 5:
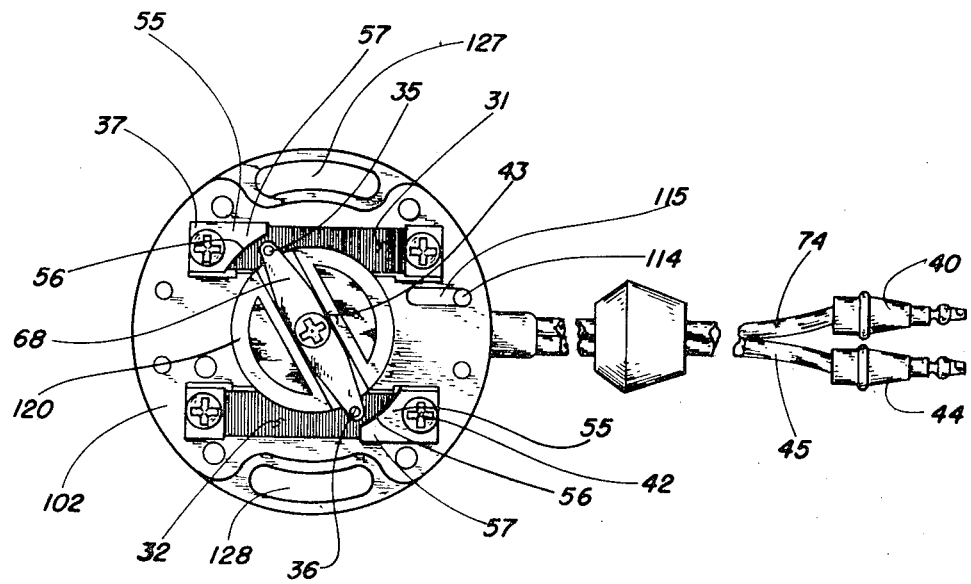
FIG. 5 is a top plan view of the variable resistor assembly with cover removed.
Figure 9:
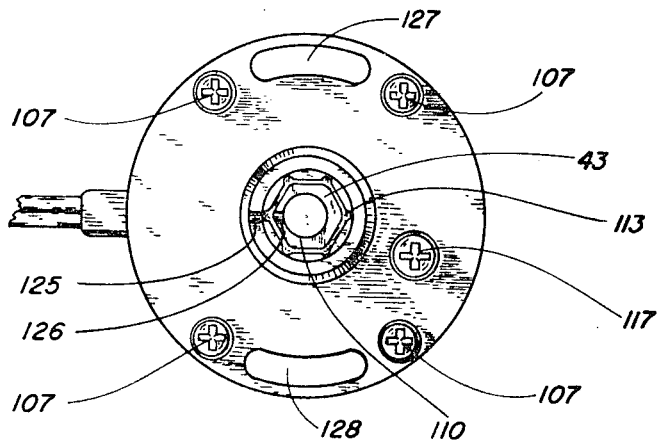
FIG. 9 is a bottom plan view of the variable resistor assembly.
Figure 10:
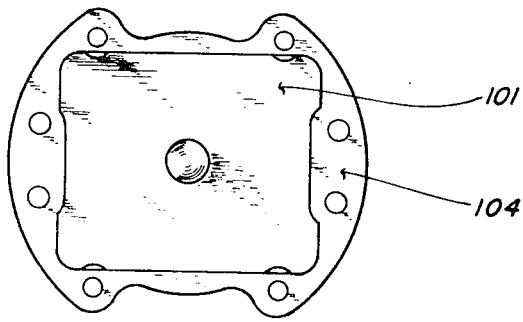
FIG. 10 is a bottom plan view of the variable resistor assembly cover.

The rotor 43 on the variable resistor assembly 30 is shown in FIG. 1, FIG. 5, and FIG. 9 in its "zero resistance" position. At this position the drive unit 14 is in position A. Zero resistance is accomplished by using an end connector 55 which has a circular cutout 56 and crimping the inside end 57 of the connector 55 to establish contact at that point. Thus, no resistance is detected by the trim indicator gauge 47. As the drive unit 14 at position A is raised toward position B, the rotor 43 is rotated clockwise (in FIG. 1 and 5) to increase the resistance between the gauge 47 and ground terminal 51 of battery 52. The trim indicator gauge 47 then indicates to the operator the position of the drive unit 14. A linear variable resistor card 31 and 32 is used since it can be purchased inexpensively and clipped from a continuous role. However, since the rotor 43 moves in a circular manner over the linear card 31 and 32, the resistance detected is not in proportion to the angular position of the drive unit 14. Further, it has been found desirable for the gauge 47 to read a much greater angular change than the unit 14 moves when going from position A to position B and a less change when the unit 14 goes from position B to position C. Such features can be designed into gauge movements of purchased gauges by means well known in the art.

Referring now to the limit switch side of the circuit (left side of FIG. 1), there is shown a limit switch assembly 60 having a housing 61 which is fixed to the left side of the member or gimbal ring 25 (FIG. 2). The limit switch assembly 60 includes two contact stips 63 and 64 fixed in the housing 61 and a contact rotor 66 fixed to the shaft 23 (not shown) to rotate therewith in a manner which will be described below. Again, in FIG. 1, the rotor 66 is shown in the position it would be when the unit is in position A. As the unit 14 is raised, the rotor 66 rotates in a direction until contact has broken.

In operation when the operator wishes to raise the drive unit 14 from its lower extreme position A, he pushes the middle or trim-up button 67. This closes the circuit through the battery ground 51, pump 18, line 75, connector 76, line 77, contact 63, rotor 66, contact 64, line 78, connector 80, line 82, push button 67, and the positive terminal 54 of battery 52. If the unit 14 reaches its extreme upward driving position B, the rotor 66 breaks the circuit by going off the contacts 63 and 64. If the operator wishes to position the unit 14 further up for trailering, he can continue to raise the unit 14 by pushing both buttons 67 and 87. In this manner the circuit will be closed from the battery ground 51, through the pump 18, line 86, button 87, button 67, and the positive terminal 54 of the battery 52. In this manner the limit switch portion of the circuit is overridden.

If it is desired to lower the unit, the lower button 90 is pushed closing the circuit between the ground 51, the pump 18, the line 91, the button 90 and the positive terminal 54 of the battery 52. Although the system is operable as shown and described, in practice it has been found advantageous to utilize a "slave relay" circuit at the hydraulic pump 18. In this manner the full current flowing through the hydraulic pump 18 does not flow through the pushbutton switches 67, 87, and/or 90.

Although the variable resistor assembly 30 and limit switch assembly 60 are shown in the preferred embodiment of this invention as being interposed between the gimbal ring 25 and the drive unit 14 at the mounting axis 16, it should be noted that any axis may be used in which two members relatively rotate upon pivot of the drive unit 14. Thus, referring to FIGS. 2-4, either of the axes 33 and 34 of the shock absorbers 19, 20 could be used. This would introduce errors in the system since the shock absorbers 19 and 20 do not rotate the same as the drive unit 14 does on its mounting axis 16. However, the positioning would still be repeatable from the indicator 47 once the operator establishes his optimum operator conditions.

Figure 6:
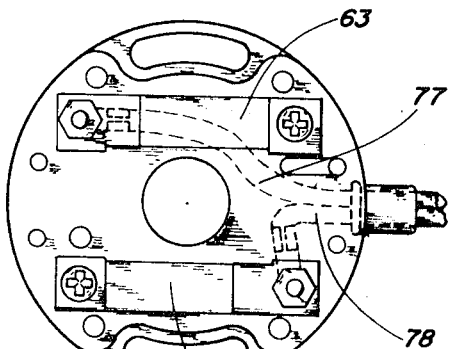
FIG. 6 is a top plan view of the limit switch with cover and rotor removed.
Figure 7:
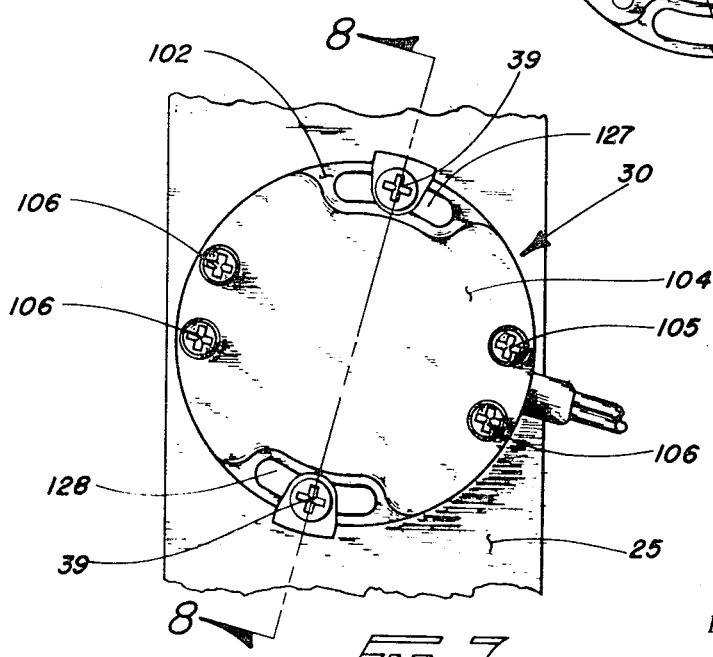
FIG. 7 is a top plan view of the variable resistor assembly mounted on a stern drive.
Figure 8:
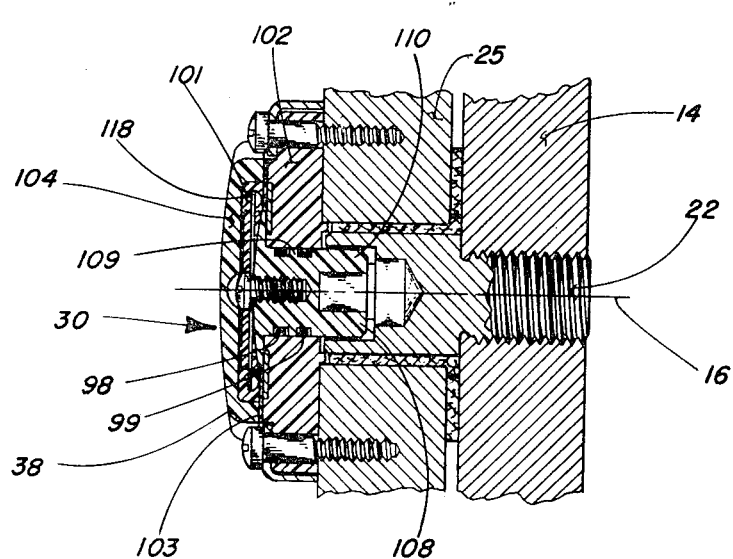
FIG. 8 is a sectional view taken along lines 8—8 of FIG. 7.

FIGS. 5-10 show further details of the variable resistor and limit switch assemblies. These assemblies are exactly alike a use interchangeable parts with the exception of the resistor assembly using resistor cards 31 and 32 (FIG. 5) and the limit switch assembly using contact strips 63 and 64 (FIG. 6). The variable resistor assembly 30 is shown and will be described in detail. The resistor assembly 30 includes a housing 38 for housing the rotor 43 and resistor cards 31 and 32. The housing 38 has a space 101 therein formed in the housing cover 104 for freedom of movement of the rotor 43. The housing also includes a sealing gasket 103 between the base 102 and the cover 104. The cover 104 and gasket 103 are firmly secured to the base by eight screws. Three screws 106 being inserted through the cover 104 and gasket and into the base (FIG. 7) and four screws 107 being inserted through the base and into the cover (FIG. 9). One of the screws 105 shown in FIG. 7 serves an additional special purpose which will be explained later.

The rotor 43 has a shaft 108 with a circular first portion 109 carried rotationally in the housing base 102, and a nonround portion 110 which mates into a nonround hole 111 in the end face 112 of the horizontal shaft 22. The nonround portion 110 is shown as hexagonal and in its preferred embodiment includes outwardly extending ribs 113 at each corner of the hexagon to provide an interference fit into the hole 111 in the shaft 22. The hole 111 in the shaft 22 is preferably also a hexagon to provide initial adjustment of the assembly 30. The first portion 109 of the shaft has a pair of seals 98, 99 thereon to seal the shaft 108 within the housing base 102. To further seal the assembly 30, a heated potting compound 118 (such as that known by the trademark Biwax) is injected through the hole 117, into space 101, and slot 115 until it flows out the hole 114. The screws 105 and 117 are then inserted sealing the assembly 30 in a watertight manner. The rotor 30 also includes a head portion 120 within the housing upon which the contact arm 68 is connected at its center. The head portion 120 is circular in shape to move freely through the potting compound 118 and reduce the shear forces on the contact arm 68 upon rapid movement of the outboard drive unit 14 such as when striking an underwater object. The housing cover 104 has a space 101 formed therein to provide the space in which the rotor 43 is carried. The head 120 is designed to closely fit under the housing cover 104 such that when the shaft portion 110 is forced into the end hole 111 of the horizontal shaft 22, the cover 104 forces the shaft 110 into the mating hole 111. The rotor arm 68 is a spring steel stamping to assure continuous contact no matter where the rotor 43 is positioned axially in the space 101.

Referring to FIG. 9 there is a small mark 125 formed on the base 102 of the housing 38 and a corresponding mark 126 formed on the end of the shaft portion 110. At assembly these two marks 125 and 126 are aligned as shown in FIG. 9 to position the rotor 43 in the zero resistance position shown in FIG. 5. When the assembly 30 is installed, the drive unit 14 is in its downward position A. The slots 127 and 128 for mounting screws 39 then allow freedom to insert the shaft 108 into the hole 111 and provide the preadjustment of "zero resistance" corresponding with full down position A of the drive unit 14. Further, two pairs of mounting holes 135 are provided to give the installer a choice at installation.

Thus, at installation, the unit 14 is positioned in position A, the marks 125 and 126 on the variable resistor assembly 30 are aligned, and the shaft 110 is forced into hole 111 by the installer's hand. The housing 38 is then turned until the indicator 47 reads position A. Finally, the screws 39 are inserted to complete the mounting. The marks on the limit switch assembly 60 are then aligned and it is similarly mounted. This provides means for initial adjustment of said assembly 30 at installation.

What is claimed is:

1. In a marine drive having an outboard drive unit carried on the transom of a boat for angular movement about a mounting axis and including members connected together at a pivot axis such that there is relative rotation between said members upon angular movement of said unit about said mounting axis, the improvement comprising:
    a. a source of electrical energy;
    b. an electrical indicator for indicating the angular position of said unit about said mounting axis, one side of said indicator being connected to one side of said source; and
    c. a variable resistor assembly interposed between two of said members at said pivot axis such that the resistance of said assembly is varied in accordance with the angular position of said unit about said mounting axis, said resistor assembly being interconnected between the other side of said source and the other side of said indicator.

2. The improvement as in claim 1 wherein said pivot axis is generally parallel to said mounting axis.

3. The improvement as in claim 1 wherein said pivot is coincidental with said mounting axis.

4. The improvement of claim 1 wherein said variable resistor assembly includes a housing fixed to one of said members by means to provide initial adjustment of said assembly at installation.

5. The improvement of claim 1 wherein the mounting axis is a horizontal tilt axis generally perpendicular to the fore-and-aft centerline of the boat.

6. The improvement as in claim 1 further comprising:
   a. means for positioning said drive unit about said mounting axis at any angular position within a given angular range; and
   b. a limit switch assembly interposed between a pair of said members at said pivot axis for disconnecting said means for positioning when the unit reaches a maximum predetermined angular position.

7. The improvement of claim 6 wherein said limit switch assembly comprises:
   a. a housing fixed to one of a pair of said members and having a space therein;
   b. a contact rotor rotationally carried in said switch housing and fixed to the other of said pair of members, said rotor having two diametrically opposite contacts; and
   c. a pair of contact cards mounted in said switch housing on diametrically opposite sides of said switch rotor for contact by the respective switch rotor contacts, said cards being connected to the means for positioning to provide disconnecting.

8. The improvement of claim 7 wherein said resistor card includes a connector on one end having a generally circular cutout to provide a zero resistance for said contact rotor.

9. The improvement of claim 6 wherein said limit switch assembly and said variable resistor assembly are on opposite ends of said pivot axis.

10. The improvement as claimed in claim 6 wherein said cariable resistor assembly and said limit switch assembly contained interchangeable parts.

11. The improvement as claimed in claim 1 wherein said variable resistor assembly comprises:
   a. a housing fixed to one of said two members and having a space therein;
   b. a contact rotor rotationally carried in said housing and fixed to the other of said two members, said rotor having two diametrically opposite contacts; and
   c. a pair of variable resistor cards mounted in said housing on diametrically opposite sides of said rotor for contact by the respective contacts, one of said cards being connected to the source and the other to the meter.

12. The improvement of claim 11 further comprising:
   a. means for positioning said drive unit about said mounting axis at any angular position within a given angular range; and
   b. a limit switch assembly interposed between a pair of said members at said pivot axis for disconnecting said means for positioning when the unit reaches a maximum predetermined angular position.

13. The improvement of claim 11 wherein said limit switch assembly comprises:
   a. a housing fixed to one of said pair of members and having a space therein;
   b. a contact rotor rotationally carried in said housing and fixed to the other of said pair of members, said rotor having two diametrically opposite contacts; and
   c. a pair of contact cards mounted in said housing on diametrically opposite sides of said rotor for contact by the respective rotor contacts, said cards being connected to the means for positioning to provide disconnecting.

14. The improvement of claim 13 wherein the space in said housing is sealed and contains potting compound therein.

15. The improvement of claim 14 wherein said rotor includes a circular head in said housing for minimal resistance to movement in said potting compound and wherein said contact rotor is supported on said head.

16. The improvement of claim 13 wherein the housing and contact rotor of the variable resistor assembly are respectively interchangeable with the housing and contact rotor of the limit switch assembly.

17. The improvement of claim 11 wherein said other member includes a shaft on said axis rotationally mounted in said one member, said shaft having an end face therein exposed outwardly with a nonround hole therein and said rotor further comprises:
   a. a second shaft formed to fit in the hole in said shaft; and
   b. a head portion fitting closely in the space in said housing such that when said housing is fixed to said one member, said second shaft is prevented from escaping from the hole in said first shaft.

18. The improvement of claim 17 wherein said hole is polygonal in shape and said second shaft is also polygonal in shape and includes outwardly extending ribs at each corner of the polygon for an interference fit into said hole.

19. The improvement of claim 11 wherein the space in said housing is sealed and contains potting compound therein.

20. The improvement of claim 14 wherein said rotor includes a circular head in said housing for minimal resistance to movement in said potting compound and wherein said contact rotor is supported on said head.

21. In a marine drive having an outboard drive unit carried by a mounting assembly on the transom of a boat on a horizontal axis perpendicular to the fore-and-aft boat centerline, the improvement comprising:
   a. a hydraulic system for positioning said drive unit about said axis at any angular position within a predetermined angular range;
   b. an indicator mounted within the boat for indicating the angular position of said drive unit;
   c. a source of electrical power having one terminal connected to said gauge and a second terminal connected to said hydraulic system;
   d. a variable resistor assembly interposed between a portion of said mounting assembly and a portion of said drive unit at one end of said axis such that the resistance of said assembly varies in accordance with the angular position of said unit, said assembly being electrically interconnected between the other terminal of said battery and the indicator; and
   e. a limit switch interposed between a portion of said mounting assembly and a portion of said drive unit at the other end of said axis and electrically interconnected between said source and said hydraulic system.

* * * * *